United States Patent
Park et al.

(10) Patent No.: US 9,530,573 B2
(45) Date of Patent: Dec. 27, 2016

(54) ELECTRODE STRUCTURE, METHOD OF MANUFACTURING THE SAME, AND ENERGY STORAGE DEVICE HAVING THE SAME

(71) Applicants: SAMSUNG ELECTRONICS CO., LTD., Suwon-si (KR); SUNGKYUNKWAN UNIVERSITY FOUNDATION FOR CORPORATE COLLABORATION, Suwon-si (KR)

(72) Inventors: Jong Jin Park, Hwaseong-si (KR); Ji-hyun Bae, Seoul (KR); Dae Joon Kang, Suwon-si (KR)

(73) Assignees: SAMSUNG ELECTRONICS CO., LTD., Suwon-si (KR); SUNGKYUNKWAN UNIVERSITY FOUNDATION FOR CORPORATE COLLABORATION, Suwon-si (KR)

( * ) Notice: Subject to any disclaimer, the term of this patent is extended or adjusted under 35 U.S.C. 154(b) by 570 days.

(21) Appl. No.: 13/954,219

(22) Filed: Jul. 30, 2013

(65) Prior Publication Data

US 2014/0029164 A1 Jan. 30, 2014

(30) Foreign Application Priority Data

Jul. 30, 2012 (KR) ........................ 10-2012-0083517

(51) Int. Cl.
| | | |
|---|---|---|
| H01G 11/26 | (2013.01) | |
| H01G 11/36 | (2013.01) | |
| H01G 11/40 | (2013.01) | |
| B82Y 99/00 | (2011.01) | |
| H01G 11/28 | (2013.01) | |

(52) U.S. Cl.
CPC ............. *H01G 11/36* (2013.01); *H01G 11/26* (2013.01); *H01G 11/40* (2013.01); *B82Y 99/00* (2013.01); *H01G 11/28* (2013.01); *Y02E 60/13* (2013.01); *Y02T 10/7022* (2013.01)

(58) Field of Classification Search
USPC .......................................................... 361/502
See application file for complete search history.

(56) References Cited

U.S. PATENT DOCUMENTS

| 8,976,507 B2 * | 3/2015 | Aria ....................... B82Y 10/00 |
|---|---|---|
| | | 361/502 |
| 2009/0027828 A1 | 1/2009 | Jung et al. |
| 2009/0059474 A1 | 3/2009 | Zhamu et al. |
| 2009/0190286 A1 | 7/2009 | Tian et al. |

(Continued)

FOREIGN PATENT DOCUMENTS

KR 20130126796 A * 11/2013

OTHER PUBLICATIONS

Kim, Jae Hong, et al., "Fabrication and electrochemical properties of carbon nanotube film electrodes," Elsevier, Carbon, No. 44, Mar. 15, 2006, pp. 1963-1968.

(Continued)

*Primary Examiner* — Eric Thomas
(74) *Attorney, Agent, or Firm* — Sughrue Mion, PLLC

(57) ABSTRACT

The electrode structure includes: a textile-type conductive substrate; a first layer which is disposed on the textile-type conductive substrate and includes a plurality of one-dimensional nanostructures; and a second layer which is formed on the first layer and includes a graphene material.

11 Claims, 6 Drawing Sheets

(56) References Cited

U.S. PATENT DOCUMENTS

| | | | |
|---|---|---|---|
| 2011/0183180 A1 | 7/2011 | Yu et al. | |
| 2011/0204020 A1* | 8/2011 | Ray | B82Y 25/00 216/13 |
| 2011/0287316 A1 | 11/2011 | Lu et al. | |

OTHER PUBLICATIONS

Chou, Shu-Lei, et al., "Electrodeposition of $MnO_2$ nanowires on carbon nanotube paper as free-standing, flexible electrode for supercapacitors," Elsevier, Electrochemistry Communications, No. 10, Sep. 8, 2008, pp. 1724-1727.

Lee, Seung Woo, et al., "Layer-by-Layer Assembly of All Carbon Nanotube Ultrathin Films for Electrochemical Applications," American Chemical Society, Journal of American Chemical Society, vol. 131, No. 2, Dec. 23, 2008, pp. 671-679.

Cooper, Leora, et al., "Freestanding, bendable thin film for supercapacitors using DNA-dispersed double walled carbon nanotubes," American Institute of Physics, Applied Physics Letters, No. 95, 233104, Dec. 7, 2009, pp. 1-3.

Kaempgen, Martti, et al., "Printable Thin Film Supercapacitors Using Single-Walled Carbon Nanotubes," American Chemical Society, Nano Letters, vol. 9, No. 5, Apr. 6, 2009, pp. 1872-1876.

Zhao, Xin, et al., "Spray deposition of steam treated and functionalized single-walled and multi-walled carbon nanotube films for supercapacitors," IOP Publishing Ltd., Nanotechnology, No. 20, Jan. 15, 2009, pp. 1-9.

Hu, Liangbing, et al., "Highly conductive paper for energy-storage devices," PNAS, vol. 106, No. 51, Dec. 22, 2009, pp. 21490-21494.

Fan, Zhuangjun, et al., "A Three-Dimensional Carbon Nanotube/ Graphene Sandwich and Its Application as Electrode in Supercapacitors," WILEY-VCH Verlag GmbH & Co. KGaA, Weinheim, Advanced Materials, No. 22, Jul. 22, 2010, pp. 3723-3728.

Yu, Dingshan, et al., "Self-Assembled Graphene/Carbon Nanotube Hybrid Films for Supercapacitors," American Chemical Society, The Journal of Physical Chemistry Letters, No. 1, Dec. 22, 2009, pp. 467-470.

Byon, Hye Ryung, et al., "Thin films of carbon nanotubes and chemically reduced graphenes for electrochemical micro-capacitors," Elsevier, Carbon, No. 49, Sep. 29, 2010, pp. 457-467.

Stoner, Brian R., et al., "Graphenated carbon nanotubes for enhanced electrochemical double layer capacitor performance," American Institute of Physics, Applied Physics Letters, No. 99, 183104, Nov. 2, 2011, pp. 1-3.

* cited by examiner

ELECTRODE STRUCTURE, METHOD OF MANUFACTURING THE SAME, AND ENERGY STORAGE DEVICE HAVING THE SAME

CROSS-REFERENCE TO RELATED APPLICATIONS

This application claims the priority from Korean Patent Application No. 10-2012-0083517, filed on Jul. 30, 2012, in the Korean Intellectual Property Office, the disclosure of which is incorporated herein in its entirety by reference.

BACKGROUND

1. Field

Apparatuses and methods consistent with exemplary embodiments relate to providing an electrode structure, a method of manufacturing the same, and an energy storage device having the same.

2. Description of the Related Art

Electrochemical capacitors, known as supercapacitors or ultracapacitors, are energy storage devices using charge storage occurring in an interface between an electrolyte and an electrode. Electrochemical capacitors have middle characteristics between those of electrolytic capacitors and secondary batteries and are primarily utilized as an energy storage devices. Electrochemical capacitors have the capability of quickly charging/discharging, a high degree of efficiency, and semi-permanent durability. Electrochemical capacitors may replace secondary batteries or may be used together with secondary batteries.

A capacity of a supercapacitor is proportional to the area of an electrode. Although the capacity of a supercapacitor may be increased by increasing the volume of the supercapacitor, the size of the supercapacitor is limited depending on the application that the supercapacitor is used in. Accordingly, an increase in capacity due to the increase of a specific surface area corresponding to a surface area per unit volume is desirable.

In the related art, there is a method of using a porous electrode material with good conductivity in order to increase the specific surface area of an electrode. Development of an electrode material suitable for an increase in a specific surface area and an increase in charge mobility is a method for effectively increasing the capacity of a supercapacitor is ongoing. For example, in the related art, a miniaturized Electric Double Layer Capacitor (EDLC) using a large specific surface area of an active carbon material was commercialized for memory backup of various electronic devices in 1980s. Recent developments of electrode materials and manufacturing techniques in the related art has led to an increase in the development of mid to large-sized products, thereby highlighting the importance as next-generation high-reliability energy storage devices, such as power sources for equipment for military-use, aerospace-use, medical use, and so forth, propulsion powering systems of Hybrid Electric Vehicles (HEVs) and Fuel Cell Electric Vehicles (FCEVs), power systems adapting to a load change in alternative resources of energy, and so forth, for efficient use of energy.

SUMMARY

Exemplary embodiments provide methods and apparatuses for an electrode structure, a method of manufacturing the same, and an energy storage device having the same.

According to an aspect of an exemplary embodiment, there is provided an electrode structure including: a textile-type conductive substrate; a first layer which is disposed on the textile-type conductive substrate and includes a plurality of one-dimensional nanostructures; and a second layer which is disposed on the first layer and includes a graphene material.

The electrode structure may include a plurality of first layers and a plurality of second layer are alternately layered on the textile-type conductive substrate.

Each of the plurality of one-dimensional nanostructures may include at least one of a carbon fiber and a carbon nanotube.

The second layer may include at least one of graphene and graphene oxide.

The textile-type conductive substrate may include a textile fiber and a conductive layer provided on the surface of the textile fiber.

The textile fiber may include a polymer.

The conductive layer may include at least one metal layer, and the at least one metal layer may include at least one metal layer selected from the group consisting of nickel (Ni), copper (Cu), and gold (Au).

According to an aspect of another exemplary embodiment, there is provided a method of manufacturing an electrode structure, the method including: preparing a textile-type conductive substrate; forming a first layer, which includes a plurality of one-dimensional nanostructures, on the textile-type conductive substrate; and forming a second layer, which includes a graphene material, on the first layer.

The forming of the first layer may include: performing surface processing to positively charge the surface of the textile-type conductive substrate; wherein the plurality of one-dimensional nanostructures are self-assembled on the textile-type conductive substrate.

The method may further include performing surface processing to positively charge the surface of the second layer.

The method may further include forming a third layer, which is formed of a plurality of one-dimensional nanostructures, on the second layer.

The preparing of the textile-type conductive substrate may include: preparing a textile fiber of a polymer material; and coating a conductive layer on the surface of the textile fiber.

Each of the plurality of one-dimensional nanostructures may include at least one of a carbon fiber and a carbon nanotube. The second layer may include at least one of graphene and graphene oxide.

According to an aspect of another exemplary embodiment, there is provided an energy storage device including: first and second porous electrodes arranged to face each other; an electrolyte for filling an area between the first and second porous electrodes; and a separator film interposed between the first and second porous electrodes, wherein each of the first and second porous electrodes includes: a textile-type conductive substrate; a first layer which is disposed on the textile-type conductive substrate and includes a plurality of one-dimensional nanostructures; and a second layer which is disposed on the first layer and includes a graphene material.

Each of the first and second porous electrodes may include a structure in which the first layer and the second layer are alternately layered at least once on the textile-type conductive substrate.

Each of the plurality of one-dimensional nanostructures may include at least one of a carbon fiber and a carbon nanotube. The second layer may include at least one of graphene or graphene oxide.

The textile-type conductive substrate may include a textile fiber and a conductive layer provided on the surface of the textile fiber.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
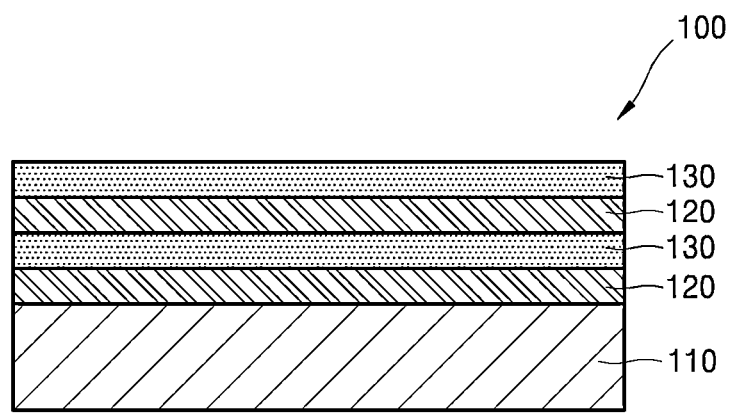
FIG. 1 is a cross-sectional view of an electrode structure according to an exemplary embodiment.

Certain exemplary embodiments will now be described in greater detail with reference to the accompanying drawings, wherein like reference numerals refer to the like elements throughout the drawings, and sizes of components in the drawings may be exaggerated for clarity and convenience of description. In this regard, the exemplary embodiments may have different forms and should not be construed as being limited to the descriptions set forth herein. Accordingly, the exemplary embodiments are merely described below, by referring to the figures, to explain aspects of the present description. Hereinafter, the term "on" or "above" may include directly above in a contact fashion and indirectly above in a non-contact fashion. As used herein, expressions such as "at least one of," when preceding a list of elements, modify the entire list of elements and do not modify the individual elements of the list.

FIG. 1 is a cross-sectional view of an electrode structure 100 according to an exemplary embodiment.

Referring to FIG. 1, the electrode structure 100 includes a textile-type conductive substrate 110, a first layer 120, which is formed on the textile-type conductive substrate 110 and is formed of a plurality of one-dimensional nanostructures, and a second layer 130, which is formed on the first layer 120 and is formed of a graphene material.

The first layer 120 and the second layer 130 may be alternately layered once or more on the textile-type conductive substrate 110. Although it is shown in FIG. 1 that the first layer 120 and the second layer 130 are alternately layered twice, the structure of the first layer 120 and the second layer 130 is not limited thereto.

The term "textile-type" may refer to any material made of interlaced or woven fibers.

The electrode structure 100 has a porous structure for increasing a specific surface area thereof with high electrical conductivity.

A structure of each of layers forming the electrode structure 100 will now be described in more detail with reference to FIGS. 2 to 5.

Figure 2:
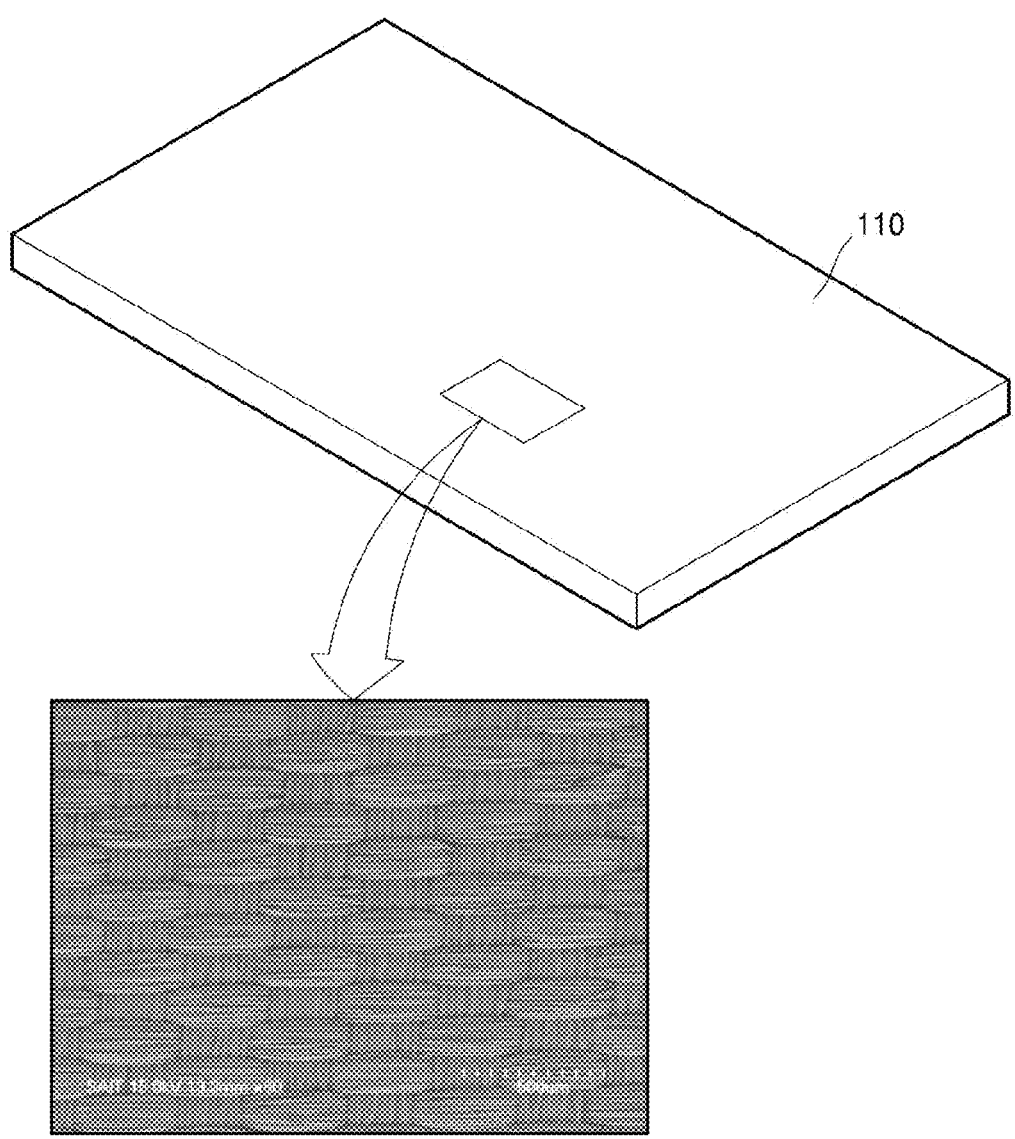
FIG. 2 illustrates a microphotograph of the surface of a textile-type conductive substrate included in the electrode structure of FIG. 1.
Figure 3:
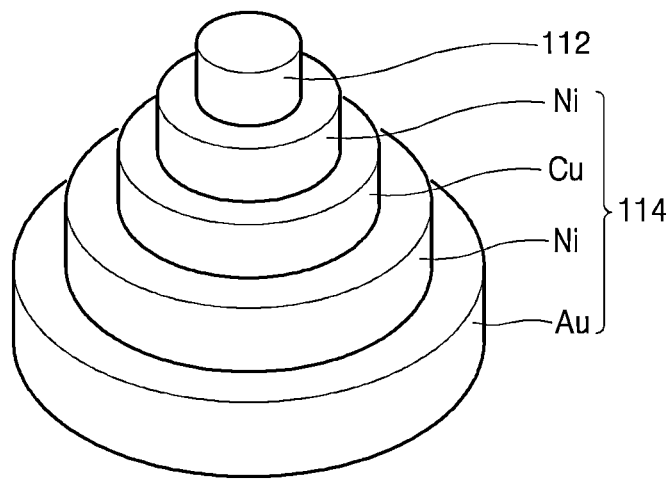
FIG. 3 is a perspective view of a textile fiber and a conductive layer forming the textile-type conductive substrate included in the electrode structure of FIG. 1.

FIG. 2 illustrates the textile-type conductive substrate 110 included in the electrode structure 100 of FIG. 1 and a microphotograph of the surface of the textile-type conductive substrate 110. FIG. 3 is a perspective view of a textile fiber 112 and a conductive layer 114 forming the textile-type conductive substrate 110 included in the electrode structure 100 of FIG. 1.

The textile-type conductive substrate 110 may include a textile fiber 112 of a flexible material and a conductive layer 114 coated on the surface of the textile fiber 112. The textile fiber 112 may have a plurality of fiber strands are woven in a predetermined pattern. For instance, the textile fiber 112 may have a rectangular shape, but is not limited thereto. The textile fiber 112 may include a polymer, such as, for example, polystyrene, polyester, or polyurethane. However, the textile fiber 112 is not limited thereto and may be of various materials. A diameter of the textile fiber 112 may be variously adjusted if necessary and, for example, may be about 20 to about 150 μm but is not limited thereto.

The conductive layer 114 may be coated to cover the entire outer surface of the textile fiber 112. The conductive layer 114 may be coated on the surface of the textile fiber 112 using a non-electrolytic plating or sputtering method.

The conductive layer 114 may be formed with a thickness of, for example, about 100 nm to 1 μm. However, this is only illustrative, and the conductive layer 114 may be formed with various other thicknesses. The conductive layer 114 may include one or more metal layers. The metal layer may include at least one selected from the group consisting of, for example, nickel (Ni), copper (Cu), and gold (Au). For example, as shown in FIG. 3, the conductive layer 114 may have a structure in which an Ni layer, a Cu layer, an Ni layer, and an Au layer are sequentially coated on the textile fiber 112 but is not limited thereto.

The surface of the textile-type conductive substrate 110 may be surface-processed to have predetermined charges, for example, to be charged with positive charges, and accordingly, the first layer 120 including a plurality of nanostructures charged with negative charges may be self-assembled on the textile-type conductive substrate 110.

Figure 4:
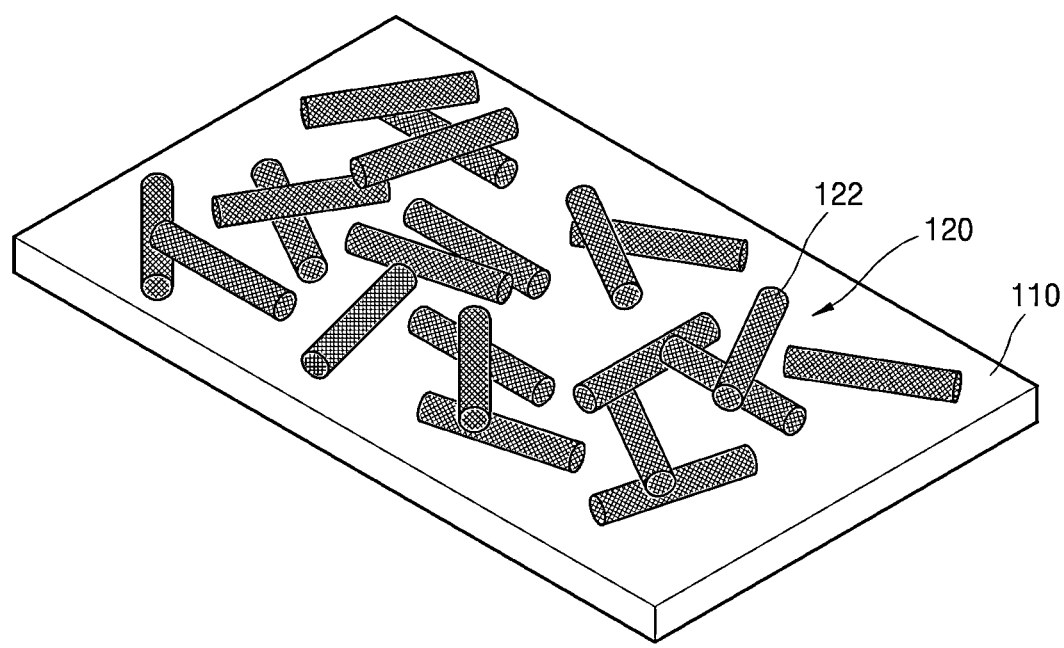
FIG. 4 is a schematic structure of a first layer included in the electrode structure of FIG. 1.

FIG. 4 is a schematic structure of the first layer 120 included in the electrode structure 100 of FIG. 1.

Referring to FIG. 4, the first layer 120 may be of a plurality of one-dimensional nanostructures 122. A "one-dimensional nanostructure" may refer to nanotubes, nanorods, nanocylinders, and nanowires of inorganic composition, generally having nano-sized diameters, and wherein their one-dimensionality originates from their large aspect ratios. As shown in FIG. 4, the first layer may be formed on the textile-type conductive substrate 110. A carbon fiber or a carbon nanotube may be used as the one-dimensional nanostructures 122.

The carbon nanotube is a cylindrical crystal having a nano-sized diameter and made by carbon atoms. The carbon nanotube is classified as a single-wall carbon nanotube or a multi-wall carbon nanotube based on the number of surfaces forming a cylinder. Since all carbon atoms are exposed on the surfaces, the carbon nanotube has a wide effective surface area. Furthermore since an entangled pattern of a wiggly nanotube makes another type of porous structure, an effective area of the carbon nanotube may be doubled. Since electrical conductivity of the carbon nanotube is also higher than an existing active carbon, the carbon nanotube is helpful for high power applications.

Figure 5:
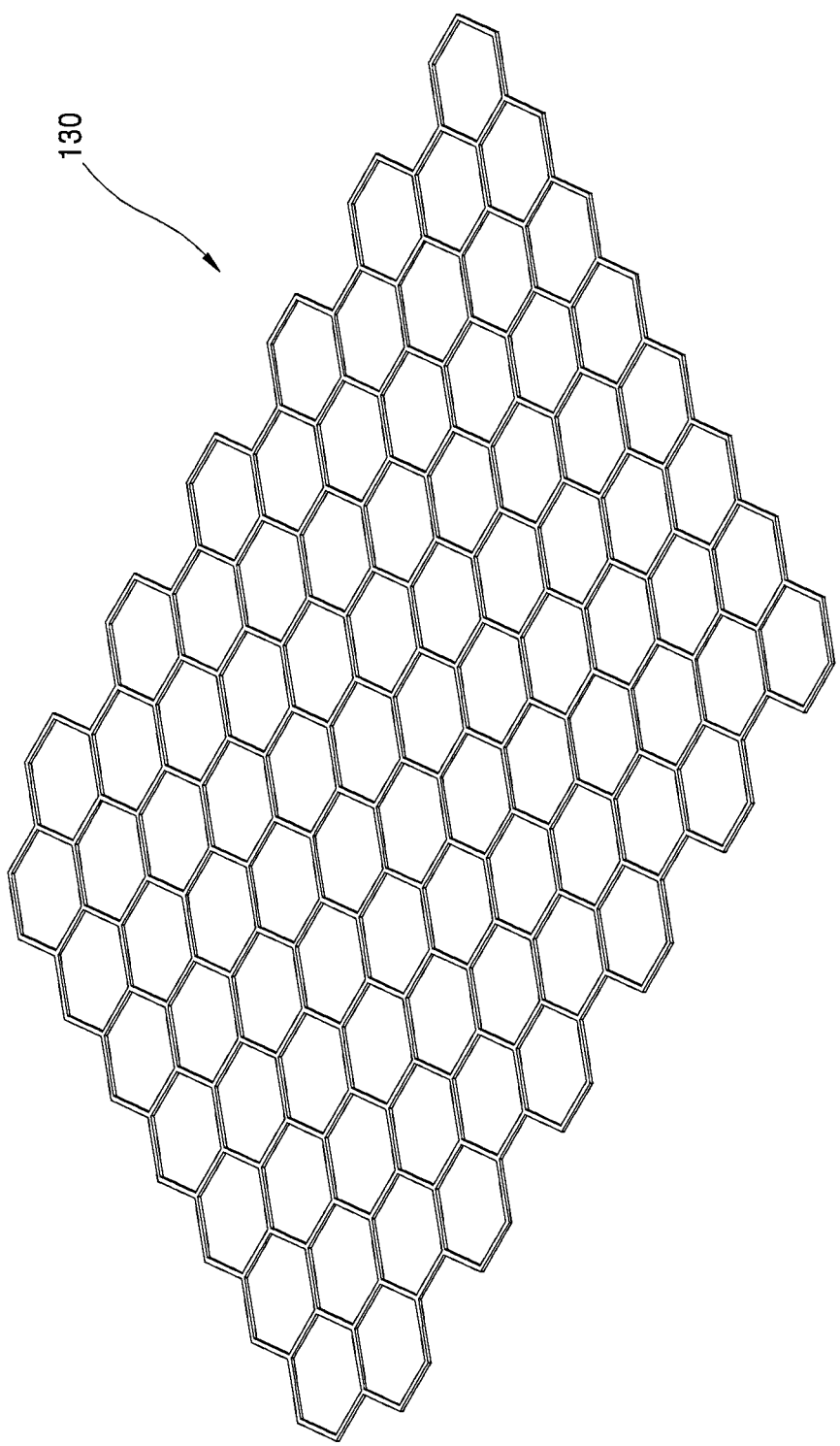
FIG. 5 is a schematic structure of a second layer included in the electrode structure of FIG. 1.

FIG. 5 is a schematic structure of the second layer 130 included in the electrode structure 100 of FIG. 1.

Referring to FIG. 5, the second layer 130 may be formed of a graphene or graphene oxide. The graphene is a thin-film material in which carbon atoms are two-dimensionally arranged, and since a thickness of the graphene is as thin as one-atom layer, and charges in the graphene act as zero effective mass particles, mobility of the charges in the graphene is very high. The graphene may be grown on a metallic thin film, such as Cu or Ni, using chemical vapor deposition (CVP) or formed in a thermal decomposition method using a silicon carbide (SiC) substrate. The formed graphene may be transferred onto the first layer 120 according to a predetermined transfer method. The surface of the first layer 120 may be surface-processed to be charged with predetermined charges, for example, positive charges, and accordingly, the second layer 130 formed of a plurality of nanostructures may be self-assembled on the first layer 120.

Figure 6:
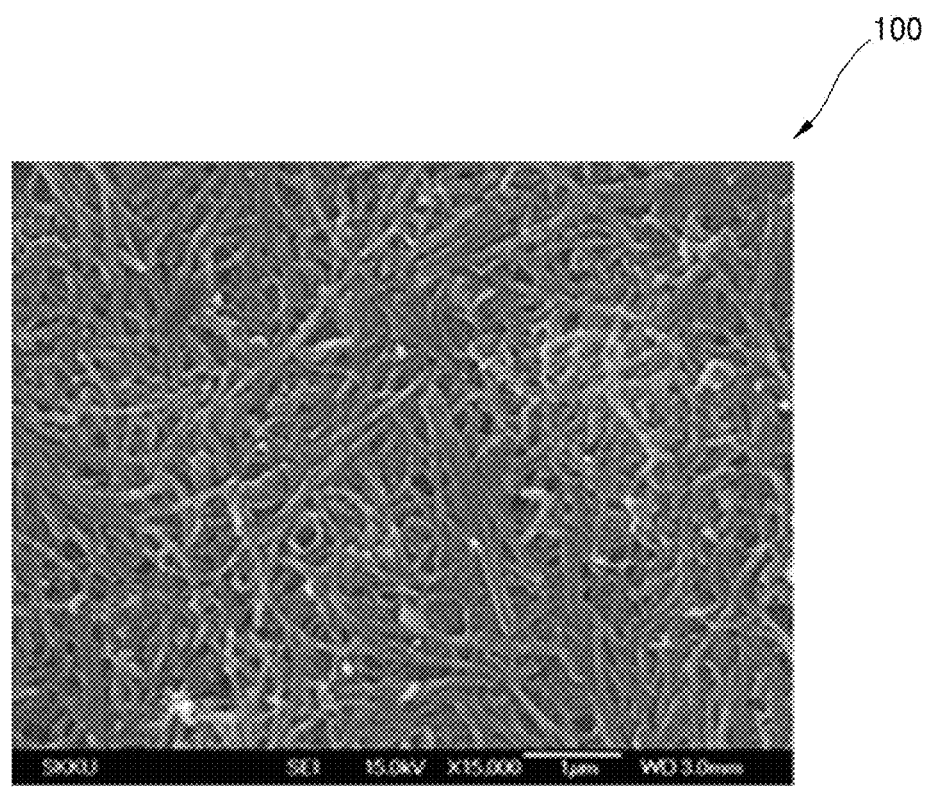
FIG. 6 is a microphotograph of the surface of the electrode structure of FIG. 1.

FIG. 6 is a microphotograph of the surface of the electrode structure 100 of FIG. 1.

A method of manufacturing the electrode structure 100 of FIG. 1 will now be schematically described. The manufacturing method described below is only illustrative and is not limited thereto.

First, the textile-type conductive substrate 110, in which a conductive material is coated on a polymer-group textile fiber, is prepared. As shown in FIG. 3, the textile-type conductive substrate 110 may be prepared using a method of coating the conductive layer 114 on the surface of the textile fiber 112 of a polymer material, for example, a non-electrolytic plating or sputtering method.

The surface of the textile-type conductive substrate 110 may be surface-processed to be charged with predetermined charges, for example, positive charges. Next, when the textile-type conductive substrate 110 is dipped in an aqueous solution in which carbon nanotubes are distributed, the carbon nanotubes charged with negative charges are self-assembled on the surface of the textile-type conductive substrate 110 charged with positive charges, thereby forming the first layer 120.

Next, a graphene is synthesized and transferred onto the first layer 120. CVP may be used as a graphene synthesis method. For example, a metal catalyst layer is formed by vapor depositing a metal catalyst, such as nickel (Ni), copper (Cu), aluminum (Al), iron (Fe), or the like, on a silicon substrate by using a sputtering device or an electronic beam evaporator. Carbons are absorbed into the metal catalyst layer by heating the substrate, on which the metal catalyst layer is formed, and gases including carbon, such as carbon hydrides ($CH_4$, $C_2H_2$, and $C_2H_4$), carbon oxide (CO) and the like, in a reactor for CVP or Inductive Coupled Plasma Chemical Vapor Deposition (ICP-CVD). Next, the graphene is grown by quickly cooling the metal catalyst layer in which carbons are absorbed to separate and crystallize the carbons from the metal catalyst layer. Next, the second layer 130 is formed by separating the grown graphene from the metal catalyst layer and transferring the separated graphene onto the first layer 120.

Next, the surface of the second layer 130 may be surface-processed to be charged with predetermined charges, for example, positive charges. In addition, a plurality of carbon nanotubes may be self-assembled on the surface of the second layer 130 by a process of dipping the second layer 130 in an aqueous solution in which carbon nanotubes are distributed, thereby forming the first layer 120. The first layer 120 and the second layer 130 may be alternately formed until the desired number of layers are formed.

Figure 7:
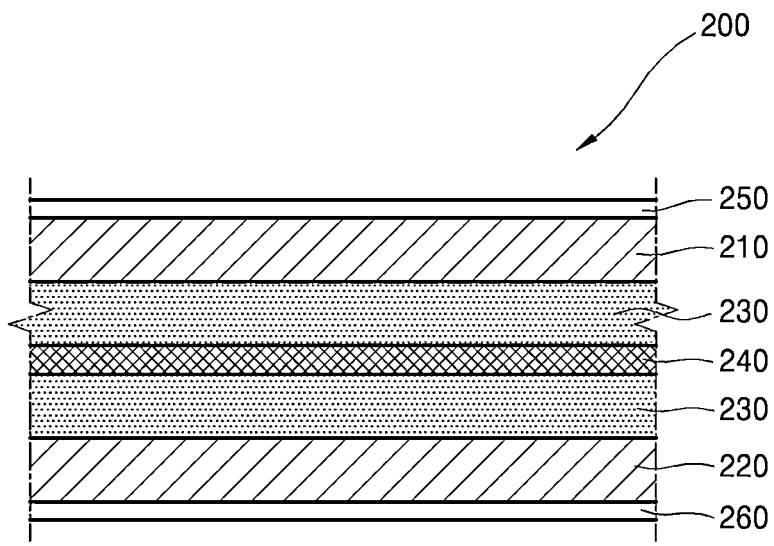
FIG. 7 is a cross-sectional view of an energy storage device according to an exemplary embodiment.

FIG. 7 is a cross-sectional view of an energy storage device 200 according to an exemplary embodiment.

Referring to FIG. 7, the energy storage device 200 includes first and second porous electrodes 210 and 220 arranged to face each other, an electrolyte 230 for filling up an area between the first and second porous electrodes 210 and 220, and a separator film 240 interposed between the first and second porous electrodes 210 and 220.

The first and second porous electrodes 210 and 220 may be an anode and a cathode, or a cathode and an anode, respectively, and may employ the electrode structure 100 shown in FIG. 1.

In addition, first and second current collectors 250 and 260 for collecting a current may be further prepared on the first and second porous electrodes 210 and 220, respectively.

The electrolyte 230 and the separator film 240 may be formed of a material commonly used for an electrochemical capacitor. For example, an aqueous or oil-based electrolyte, e.g., about 30 to 35% potassium hydroxide (KOH), 1M Tetraethyl Ammonium Tetrafluoroborate (TEABF4) in acetonitrile, 1M TEABF4 or 1M lithium hexafluorophosphate (LiPF6) in propylene carbonate, or the like, may be used as the electrolyte 230. However, this is only illustrative, and the electrolyte 230 is not limited thereto. In addition, a polymer separator film manufactured using, for example, paper (cellulose group), polyethylene, polypropylene, polyethylene terephthalate (PET), Polytetrafluoroethylene (PTFE), polyamide, or the like, may be used as the separator film 240. However, this is only illustrative, and the separator film 240 is not limited thereto.

A capacity of the energy storage device 200 is determined according to specific surface areas of the first and second porous electrodes 210 and 220 and a permittivity of the electrolyte 230. In the current exemplary embodiment, by employing the electrode structure 100 shown in FIG. 1 having a wide specific surface area as the first and second porous electrodes 210 and 220, a high capacity of the energy storage device 200 is realized. In addition, since the energy storage device 200 is formed of flexible and durable materials, stable performance on charge-discharge cycles is obtained.

Figure 8:
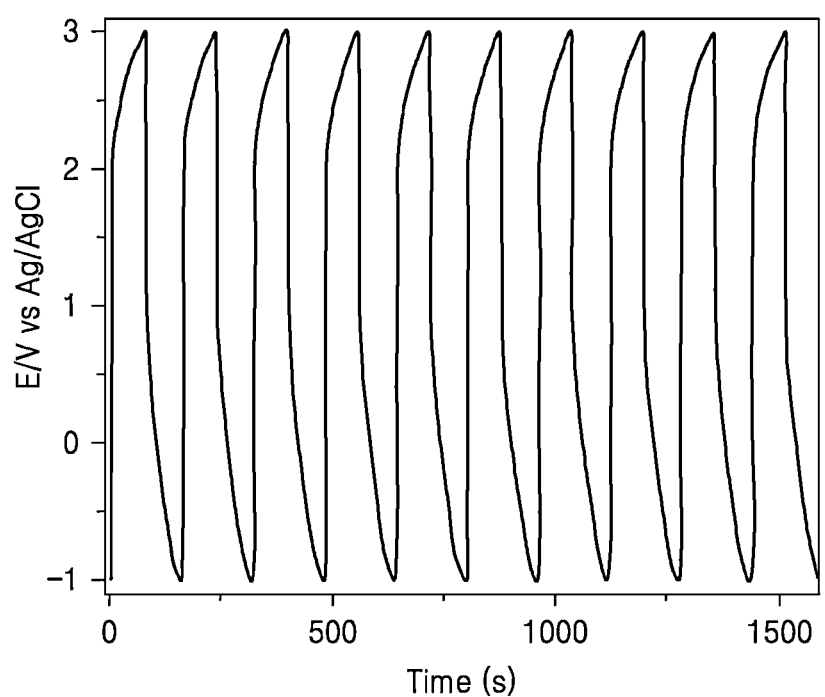
FIG. 8 is a graph illustrating charge-discharge cycles and a capacitance along time in the energy storage device of FIG. 7.

FIG. 8 is a graph showing charge-discharge cycles and a capacitance over time in the energy storage device 200 of FIG. 7.

The graph of FIG. 8 is a case where silver/silver chloride (Ag/AgCl) is used as the electrolyte 230 and shows that the charge-discharge cycles are constant over time, a change in a capacitance value is small, and reproducibility in charge/discharge is excellent.

As described above, according to the one or more of the above exemplary embodiments, since an electrode structure includes a textile-type conductive substrate of a flexible material and a one-dimensional nanostructure layer and a graphene layer formed on the textile-type conductive substrate, the electrode structure has flexibility, porous properties, a high specific surface area, and high conductivity.

Therefore, the electrode structure may be applied to a porous electrode of a large-capacity energy storage device, e.g., a supercapacitor, have strong durability against a stress generated in a number of charge-discharge cycles or a physical stress generated by continuous movement of a device, and realize a high capacity and high power.

While an electrode structure and an energy storage device including the same have been described with reference to the exemplary embodiments shown in the drawings to help the understanding, it should be understood that the exemplary embodiments described therein should be considered in a descriptive sense only and not for purposes of limitation. Descriptions of features or aspects within each exemplary embodiment should typically be considered as available for other similar features or aspects in other exemplary embodiments and many alternatives, modifications, and variations will be apparent to those skilled in the art.

What is claimed is:

1. An electrode structure comprising:
    a textile-type conductive substrate;
    a first layer which is disposed on a surface of the textile-type conductive substrate and comprises a plurality of one-dimensional nanostructures, wherein a direction of the one-dimensional nanostructures is parallel to the surface of the textile-type conductive substrate, and a side surface of the one-dimensional nanostructures is in contact with the surface of the textile-type conductive substrate; and
    a second layer which is disposed over the first layer and comprises a monolayer of graphene, wherein the monolayer is parallel to the surface of the textile-type conductive substrate.

2. The electrode structure of claim 1, wherein the electrode structure comprises a plurality of first layers and a plurality of second layers alternately layered at least once on the textile-type conductive substrate.

3. The electrode structure of claim 1, wherein each of the plurality of one-dimensional nanostructures comprises at least one of a carbon fiber and a carbon nanotube.

4. The electrode structure of claim 1, wherein the textile-type conductive substrate comprises a textile fiber and a conductive layer provided on a surface of the textile fiber.

5. The electrode structure of claim 4, wherein the textile fiber comprises a polymer.

6. The electrode structure of claim 5, wherein the conductive layer comprises at least one metal layer.

7. The electrode structure of claim 6, wherein the at least one metal layer comprises at least one selected from the group consisting of nickel (Ni), copper (Cu), and gold (Au).

8. An energy storage device comprising:
    first and second porous electrodes arranged to face each other;
    an electrolyte filling an area between the first and second porous electrodes; and
    a separator film interposed between the first and second porous electrodes,
    wherein each of the first and second porous electrodes comprises:
    a textile-type conductive substrate;
    a first layer which is disposed on a surface of the textile-type conductive substrate and comprises a plurality of one-dimensional nanostructures, wherein a direction of the one-dimensional nanostructures is parallel to the surface of the textile-type conductive substrate, and a side surface of the one-dimensional nanostructures is in contact with the surface of the textile-type conductive substrate; and
    a second layer which is disposed over the first layer and comprises a monolayer of graphene, wherein the monolayer is parallel to the surface of the textile-type conductive substrate.

9. The energy storage device of claim 8, wherein each of the first and second porous electrodes comprises a structure in which the first layer and the second layer are alternately layered at least once on the textile-type conductive substrate.

10. The energy storage device of claim 8, wherein each of the plurality of one-dimensional nanostructures comprises at least one of a carbon fiber and a carbon nanotube.

11. The energy storage device of claim 8, wherein the textile-type conductive substrate comprises a textile fiber and a conductive layer provided on the surface of the textile fiber.

* * * * *